Patented June 26, 1945

2,378,918

UNITED STATES PATENT OFFICE 2,378,918

CYCLIC KETALS OF KETO-CYCLOPENTANO-PERHYDROPHENANTHRENES AND METHODS OF PREPARING THEM

Erhard Fernholz, deceased, late of Princeton, N. J., by Mary Briganti Fernholz, administratrix, Princeton, N. J., assignor to E. R. Squibb & Sons, New York, N. Y., a corporation of New York No Drawing. Application August 19, 1941, Serial No. 407,498

3 Claims. (Cl. 260—397.3)

This invention relates to, and has for its object the provision of, cyclic ketals of keto-cyclopentanoperhydrophenanthrenes, and a method of preparing them.

For brevity and convenience, the term "cyclopentanoperhydrophenanthrene" is hereinafter replaced by the apt telescopically-formed term cythrene.

The compounds of this invention are valuable intermediates for the production of various cythrene derivatives, especially testosterone (as described and claimed in my application Serial No. 407,497, filed August 19, 1941, now Patent No. 2,356,154, dated August 22, 1944); and, being crystalline, enable the ready recovery of keto-cythrenes from mixtures containing them, especially the recovery of substantially pure 3,17-androstenedione from oxidation product of cholestenone and cholesterol dibromide.

The method of this invention essentially comprises reacting a keto-cythrene with an aliphatic polyhydric alcohol. If the reactant is a polyketo-cythrene (e. g., 3,17-androstenedione), the conditions of the reaction may be adjusted to favor the production of either the mono- or the poly- (cyclic ketal). The invention also comprehends the method of recovering a keto-cythrene from a mixture containing it, utilizing the production of a cyclic ketal of the keto-cythrene; which method essentially comprises reacting the mixture with an aliphatic polyhydric alcohol, separating the formed keto-cythrene-(cyclic ketal), and hydrolyzing the cyclic ketal.

The following examples are illustrative of the invention:

Example 1

10 g. cholestenone, 6 cc. ethylene glycol, and a few crystals of p-toluenesulfonic acid are dissolved in 500 cc. benzene, and the mixture is refluxed for one hour and then slowly distilled for 3 hours. A pellet of KOH dissolved in alcohol is then added to neutralize the acid; after adding ether, the solution is washed with water, dried, and evaporated. The residue is then crystallized from benzene by addition of alcohol, yielding 5 g. of cholestenone-(ethylene ketal) in the form of narrow leaflets [M. P. 133° C.; $(\alpha)_{D'}$—28°].

The mother liquor of the crystalline ketal can be reconverted into cholestenone by refluxing for 1 hour in alcohol containing a few cc. of dilute hydrochloric acid, adding water, extracting with ether, evaporating the ether, and recrystallizing the residue. The cholestenone thus recovered (almost quantitatively) may be returned to the ketal-forming reaction.

Example 2

Following the procedure of the foregoing example, but using propylene glycol in place of ethylene glycol, a mixture of stereoisomeric propylene ketals of cholestenone melting at 135–140° C. is obtained. Similarly, by using trimethylene glycol in place of the ethylene glycol and reacting for about 24 hours, cholestenone-(trimethylene ketal), melting at 137° C., is obtained.

Example 3

Following the procedure of Example 1, but using stigmastadienone in place of cholestenone and reacting for about 24 hours, stigmastadienone-(ethylene ketal) melting at 131° C. is obtained.

Example 4

1 g. cholestanone, 0.6 cc. ethylene glycol, and a crystal of p-toluenesulfonic acid are dissolved in 50 cc. benzene, and the mixture is slowly distilled for 2 hours. Alcoholic KOH is then added, followed by ether, and the ether solution is washed with water, dried, and evaporated. The residue, on crystallization from alcohol, yields 0.91 g. cholestanone-(ethylene ketal), melting at 115° C. [This ketal is identical with that obtained by catalytic (palladium black) hydrogenation of cholestenone-(ethylene ketal).]

Example 5

Following the procedure of Example 4, but using 1 g. 3,6-cholestandione in place of 1 g. cholestane, 1.04 g. of 3,6-cholestandione-di-(ethylene ketal), melting at 144° C., is obtained.

Example 6

(a) 1.0 g. 3,17-androstenedione ($\Delta^4$-androstenedione-3,17), 0.23 cc. ethylene glycol, and a crystal of p-toluenesulfonic acid are dissolved in 50 cc. benzene, and the mixture is slowly distilled for 4 hours. 10 cc. of 2% alcoholic KOH is then added, followed by water, and the reaction mixture is extracted with ether. The ether is removed from the extract, and the residue dissolved in a small quantity of methanol; on standing for about 16 hours, 0.5 g. of a crystalline product is obtained, consisting of a mixture of mono- and di- (ethylene ketals) of 3,17-androstenedione.

The oily mother liquor from which the mixture of ketals crystallizes is reconverted into 3,17-androstenedione by refluxing for 1 hour in alcohol containing a few cc. of dilute hydrochloric acid, then adding water, extracting with ether, evaporating, and recrystallizing the residue. The unused 3,17-androstenedione is thus recovered almost quantitatively, and can be returned to the ketal-forming treatment.

(b) The mixture of ketals is dissolved in benzene, filtered through a 2 x 21 cm. column of alumina, and the column gradually washed through with benzene. The first 100 cc. of benzene contains 0.2 g. 3,17-androstenedione-di-(ethylene-ketal), which, on recrystallization from methanol, is obtained in the form of feathered needles melting at 173° C. The washing is then continued with benzene containing 10% alcohol, and on removal of the solvent from this wash, 0.3 g. of 3,17-androstenedione-3-(ethylene ketal) is obtained. It crystallizes from methanol in the form of thick prisms melting at 194° C.; this, however, is an unstable modification, which, on solidifying from the melted form, is transformed into the more stable modification melting at 202° C. The thus-obtained mono-(cyclic ketal) has the ketal group on $C_3$, as clearly indicated by the facts that it does not have the characteristic absorption spectrum of an $\alpha$-$\beta$-unsaturated ketone and that it is transformed into testosterone-(ethylene ketal) on hydrogenation.

*Example 7*

1.6 g. of a concentrate of 3,17-androstenedione obtained by oxidation of cholestenone (U. S. Patent 2,197,853) or cholesterol dibromide (Spielman and Meyer, J. A. C. S. 61, 893 (1939) is dissolved in 50 cc. benzene; 0.25 cc. ethylene glycol and a crystal of p-toluenesulfonic acid are added, and the mixture is slowly distilled for 3½ hours. Alcoholic KOH is then added, and the reaction product is taken up in ether and washed with water. The ether solution is dried and evaporated, and the oily residue dissolved in a small quantity of methanol; on standing, 0.38 g. of crystalline material settles out which, when purified by adsorption on alumina as described in the foregoing example (b), yields 0.3 g. of 3,17 androstenedione-3-(ethylene ketal).

If the obtention of substantially pure 3,17-drostenedione is the desired result, the crystalline ketal thus obtained is hydrolyzed into its components by refluxing for 1 hour in alcohol containing a small quantity of dilute hydrochloric acid, adding water, extracting with ether, evaporating, and recrystallizing the residue.

Manifestly, the ketal-forming reactions of Example 1 to 8 inclusive also may be utilized to recover the respective keto-cythrenes in substantially pure form from mixtures containing them.

The invention is manifestly applicable to the production of cyclic ketals of keto-cythrenes other than those used in the foregoing examples, inter alia: 3,17-androstanedione; $\Delta^4$-androstenetrione-3,11,17; $\Delta^{4,6}$-androstadienedione-3,17; $\Delta^1$-androstenedione - 3,17; $\Delta^5$-androstenedione-3,17; $\Delta^4$-androstenetrione-3,6,17; 5,6-oxo-androstanedione-3,17; pregnanedione; progesterone; luteosterone; dehydroandrosterone; androsterone; testosterone; androstanolone; 7-ketocholesterol; $\Delta^5$-androstenol-3-dione 7,17; and ketonic estrogens such as estrone, equilin, and equilenin.

The glycols used in the foregoing examples may be replaced by other aliphatic polyhydric alcohols, inter alia, glycerol and various carbohydrates. Among the conditions of the reaction which may be adjusted to favor the production of either the mono- or poly-(cyclic ketals) of polyketo-cythrenes is the ratio of the polyketo-cythrene to the aliphatic polyhydric alcohol; thus, the greater ratio of 3,17-androstenedione to ethylene glycol in Example 7 over the ratio in Example 6 maximizes the production of the mono-(cyclic ketal).

When using 3,17-androstenedione and other $\Delta^4$-3,17-diketo-cythrenes, it is believed that there is a shift of the double bond to the 5—6 position on formation of the cyclic ketal, and that the bond shifts back to the 4—5 position on regeneration of the keto group; but it is not intended that the invention shall be limited by any theoretical explanations.

The invention may be variously otherwise embodied within the scope of the appended claims.

What is claimed is:

1. The method of recovering 3,17-androstenedione from a crude preparation thereof, which comprises reacting the preparation with an aliphatic polyhydric alcohol, separating the formed 3,17-androstenedione-(cyclic ketal), and hydrolyzing the cyclic ketal.

2. The method of recovering substantially pure 3,17-androstenedione from an oxidation product of a member of the group consisting of cholestenone and chlosterol dibromide, which comprises reacting the oxidation product with an aliphatic polyhydric alcohol, separating the formed 3,17-androstenedione-(cyclic ketal), and hydrolyzing the cyclic ketal.

3. The method of recovering substantially pure 3,17-androstenedione from an oxidation product of a member of the group consisting of cholestenone and cholesterol dibromide, which comprises reacting the oxidation product with ethylene glycol, separating the formed ethylene ketal of 3,17-androstenedione, and hydrolyzing the ethylene ketal.

MARY BRIGANTI FERNHOLZ,
*Administratrix of Estate of Erhard Fernholz, Deceased.*